Figure 1:
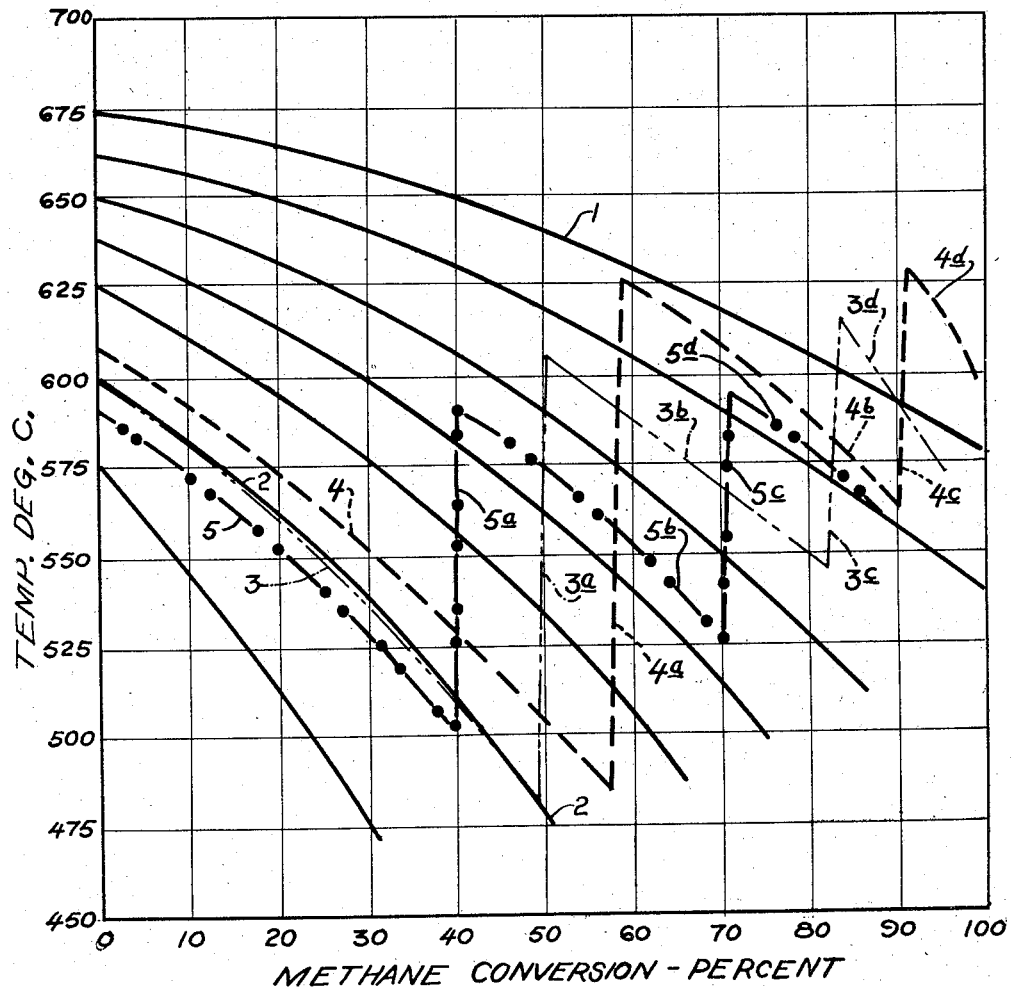

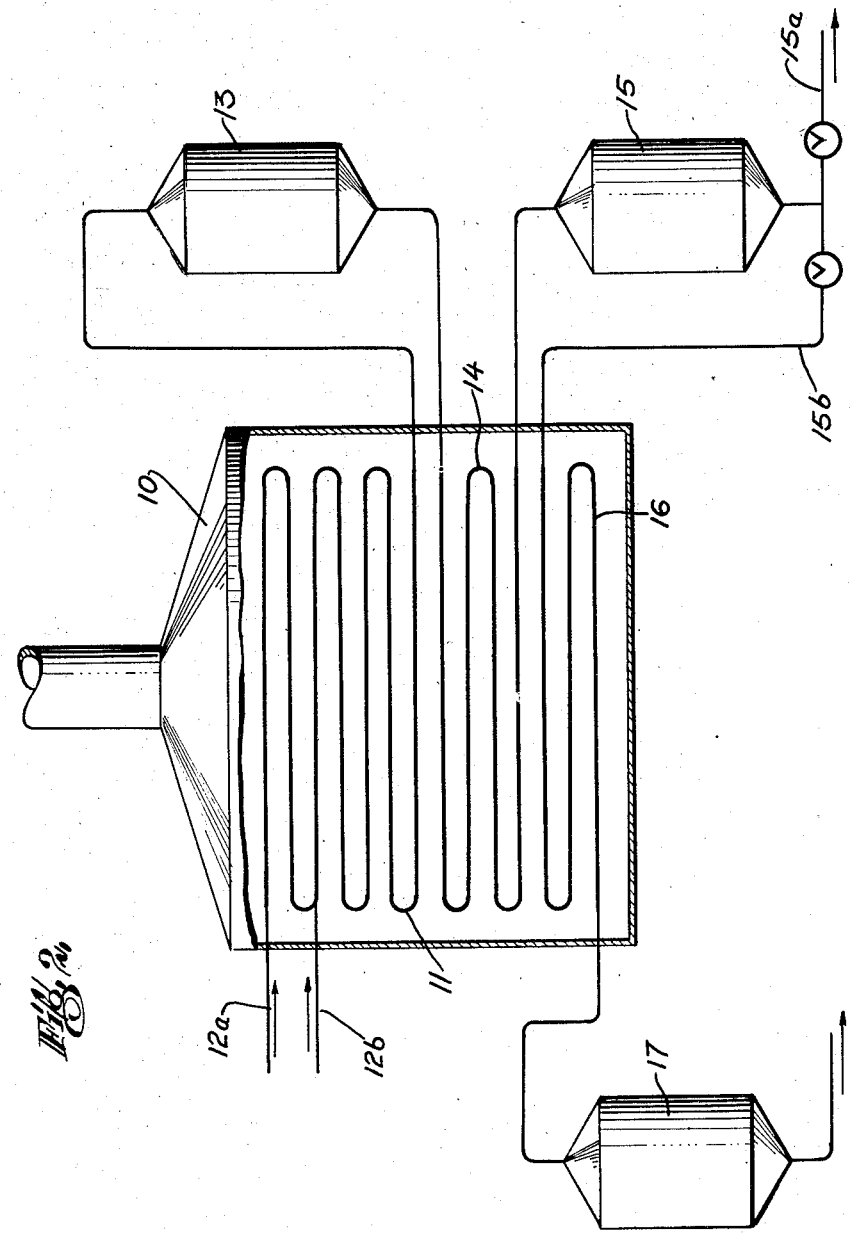

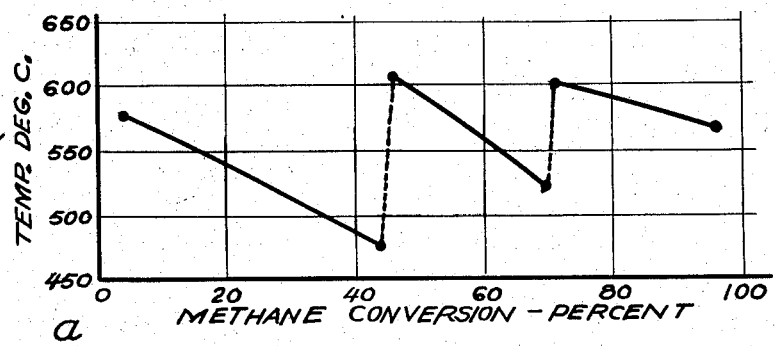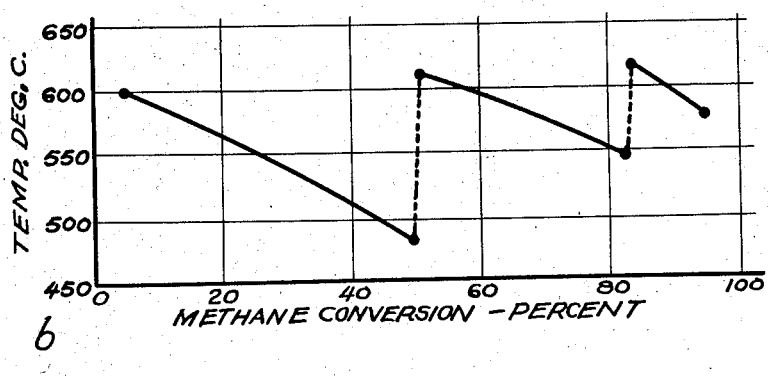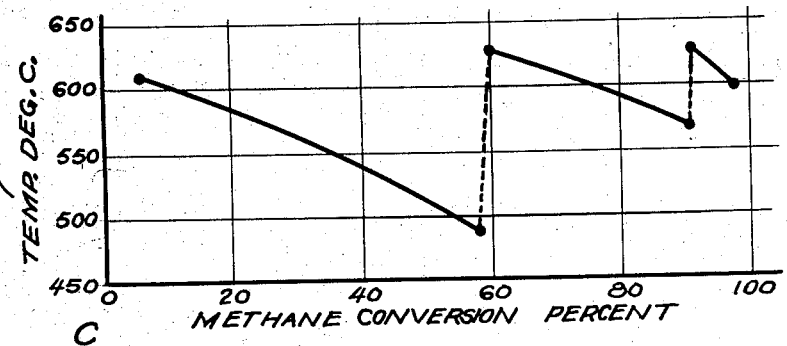

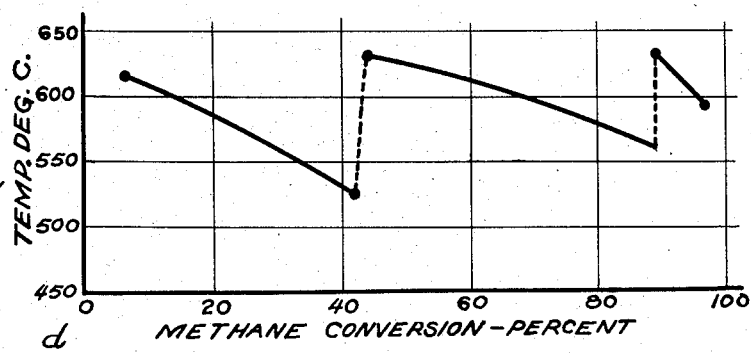
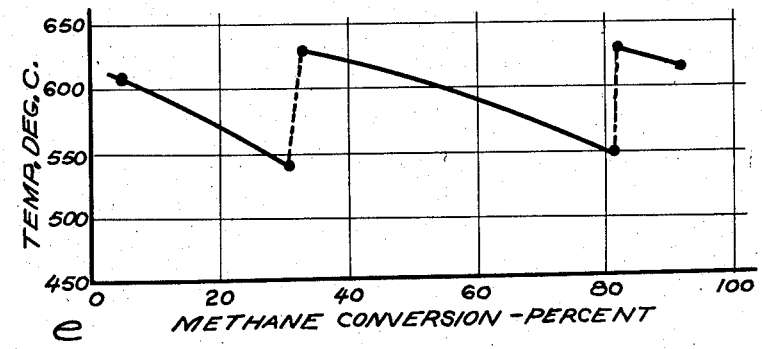
FIG. 13.
PARTS d, e AND f
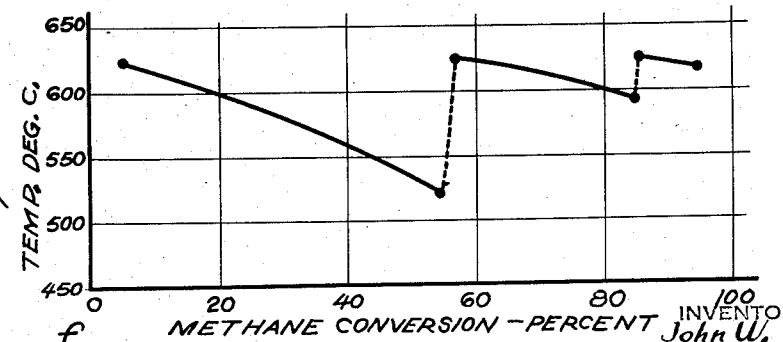

United States Patent Office 2,882,131
Patented Apr. 14, 1959

2,882,131

PREPARATION OF CARBON DISULFIDE AND HYDROGEN SULFIDE

John W. Getz, St. Albans, and Robert W. Timmerman, Charleston, W. Va., assignors to Food Machinery and Chemical Corporation, New York, N.Y., a corporation of Delaware Application March 2, 1955, Serial No. 491,710

17 Claims. (Cl. 23—181)

This invention relates to the production of carbon disulfide and hydrogen sulfide by the reaction of sulfur and hydrocarbon gases at elevated pressure and temperature with or without the presence of a catalyst.

The reaction of sulful and hydrocarbon gases to produce carbon disulfide and hydrogen sulfide in the presence of a catalyst is described, for example, in the United States patent to Thacker, No. 2,330,934. The reaction of sulfur and hydrocarbon gases to produce carbon disulfide and hydrogen sulfide without the use of a catalyst is described in United States application Serial No. 448,741, filed August 9, 1954, and owned by the assignee of the present application. Both catalytic and non-catalytic reactions may take place in the same equipment if a catalyst is present and in the normal practice of the process, catalytic conversion and non-catalytic conversion may occur simultaneously in different parts of the equipment.

Normally, in the practice of the catalytic process, the gases are heated to the desired reacting temperature and then passed through a catalyst chamber containing the desired catalyst. Below about 675° C. the reaction in the catalyst chamber is strongly endothermic and the gases may undergo a temperature drop in the catalyst chamber of 150° C. or more, depending on the temperature at which they enter the catalyst chamber, before they drop below the temperature at which the reaction rate is so low that no further material reaction takes place.

In the non-catalytic process an unheated holding or reaction chamber, similar to a catalyst bed reactor but without a catalyst therein, is desirable to provide additional time for the non-catalytic reaction to take place while the reactants are within the best reaction temperature range.

In general, the reaction temperatures preferred for either the catalytic reaction or the non-catalytic reaction are between 450° and 700° C. Below 450° C. the reaction rate is so low that only minor amount of the sulfur and hydrocarbons react, and above about 675° C. with stoichiometric amount of sulfur present, the reaction becomes exothermic and is difficult to control. More importantly, sulfur vapor at these temperatures is highly corrosive and it is desirable to keep the temperature as low as possible to provide the desired degree of reaction in order to reduce corrosion to a minimum and thereby prolong the life of the equipment.

It is an object of this invention to provide a method of producing carbon disulfide and hydrogen sulfide by the reaction of sulfur and hydrocarbon gases by which the temperature at which the process operates may be reduced while still maintaining a high percentage of conversion of the reacting materials.

Another object of this invention is to provide a method of producing carbon disulfide and hydrogen sulfide by the reaction of sulfur and hydrocarbon gases with or without the presence of a catalyst in which the sulfur vapors and hydrocarbon gases, instead of being heated to reacting temperature and then reacted in one step, are re-heated one or more times within the reaction temperature range to increase the percentage reaction and decrease the temperature differentials to which the equipment is subjected.

Various other objects and advantages of the invention will appear as this description proceeds.

Referring now to the drawings which are for the purpose of illustrating the application of the process of the present invention to one set of operation conditions, Fig. 1 illustrates the approximate adiabatic reaction temperature profiles for the reaction of sulfur and methane at various temperatures under a given set of reaction conditions, and, in dotted lines, the modification of these conditions which may be brought about by the practice of this invention.

Fig. 2 is a diagrammatic illustration of one form of apparatus in which the process of this invention may be carried out, and Fig. 3 parts $a$, $b$, $c$, $d$, $e$ and $f$ illustrate several typical sets of conditions wherein the principles of this invention may be practiced.

Fig. 1 illustrates a family of approximate adiabatic reaction temperature profiles for the reaction of sulfur and methane where the reactants are maintained at a pressure of 50 lbs. per square inch gauge at the various temperatures indicated and the sulfur is present in the ratio of 4.15 atoms of sulfur to 1 atom of carbon in the hydrocarbon gas (considered as methane) or in a stoichiometric ratio of about 4% excess sulfur. It will be understood that for different operating conditions of pressure, temperature and proportions of reactants somewhat different temperature profiles will exist, but those illustrated in Fig. 1 are typical for the specified set of operating conditions.

As is apparent from line 1 of Fig. 1 in order to obtain a conversion of 100% of the hydrocarbon gas (considered as methane) to carbon disulfide and hydrogen sulfide in one operation under the particular set of operating conditions specified, it is necessary to heat the sulfur and hydrocarbon gas mixture to 675° C. and maintain the mixture at 50 lbs. per square inch pressure while the reaction is going on. The reaction is endothermic under these conditions, and in the course of the reaction the temperature will drop to about 575° C.

As indicated by line 2 of Fig. 1, if the gases are heated to only 600° C. and passed into the catalyst chamber, and all other conditions remain the same, the gases will react to convert about 44% of the hydrocarbons (considered as methane) to carbon disulfide and hydrogen sulfide during which the temperature will drop to about 500° C. and below which little further reaction will take place.

When, however, as indicated by the broken line 3, sulfur and hydrocarbon gas are heated under the same conditions of pressure and with the same ratio of reactants to 600° C. and passed into a catalyst chamber and permitted to react with the consequent temperature drop until approximately 50% of the methane has been converted to carbon disulfide and hydrogen sulfide, the temperature will drop to about 482° C. after which no substantial further reaction will take place. If, however, the partially reacted gases are then re-heated as indicated by line 3a to about 610° C. and again passed into a catalyst chamber, a further reaction will take place with a further temperature drop as indicated by the line 3b in which an additional 33% of the hydrocarbon gases originally introduced into the process react to form carbon disulfide and hydrogen sulfide, giving a total conversion of 83%. In this reaction the temperature again drops, to about 547° C.

If now the same reacting materials are re-heated to about 615° C. as indicated by line 3c and again passed into a catalyst bed reactor, a further reaction will take place as indicated by the line 3d in which 95% of the hydrocarbon gases originally introduced into the process are reacted to form carbon disulfide and hydrogen sulfide during which third reaction period the temperature of the reactants will drop to about 575° C. The catalyst may be any of the catalytic materials mentioned in the said Thacker Patent No. 2,330,934, or any catalytic material promoting the formation of carbon disulfide.

Lines 4, 4a, 4b, 4c and 4d illustrate another application of the process in which the same reacting materials in the same proportions and under 50 lbs. per square inch pressure are originally heated to about 610° C. and passed into a catalyst chamber in which they undergo a temperature drop to about 486° C. and in which about 57% of the hydrocarbon gases are reacted to carbon disulfide and hydrogen sulfide, after which the gases are re-heated to about 625° C. and passed into a second catalyst bed reactor where an additional 34% of the hydrocarbon gases are reacted to carbon disulfide and hydrogen sulfide, giving a total reaction of 91%. At this point the reaction products could be passed to recovery apparatus such as described, for example, in the United States patent to Folkins et al. No. 2,568,121, in which the formed carbon disulfide and hydrogen sulfide are recovered and the unreacted sulfur and hydrocarbon gases stripped from the reaction products and returned for reprocessing.

If desired, however, the reacting materials may be re-heated to about 627° C. as indicated by the line 4c and passed into a third catalyst reaction chamber in which a further reaction takes place, so that 98% of the hydrocarbon gases are reacted to produce $CS_2$ and $H_2S$ and during which the temperature of the gases drops to about 596° C.

If it is desired to maintain still lower operating temperatures for the equipment, it is possible by the process of this invention to follow operating conditions such as indicated by the lines 5, 5a, 5b, 5c and 5d in which operating temperatures are maintained below 590° C. and a conversion of 87% of the hydrocarbon gases to $CS_2$ and $H_2S$ is secured. As indicated by these lines, if sulfur and hydrocarbon gases in the same ratio as in the previous illustrations and under the same pressure are heated initially to 590° C. and passed into a catalyst bed reactor in which they undergo a temperature drop to about 500° C. and in which about 41% of the hydrocarbon gases are reacted to $CS_2$ and $H_2S$ and are again re-heated to 590° C. and passed into a second catalyst bed reactor, an additional 29% of the hydrocarbon gas may be reacted in the second catalyst bed, giving a total reaction of 70% during which the temperature of the gases in the second reactor will drop to about 525° C. as indicated by the line 5b. If the same gases are again re-heated to 590° C. and passed into a third catalyst bed reactor, a further reaction along the line 5d will take place to give a total conversion of 87% of the hydrocarbon gases during which the temperature will drop to about 560° C.

It will be appreciated that with increasing percentages of hydrocarbon gases converted, the rate of reaction drops at any given temperature so that below the approximate temperatures indicated the reaction rate becomes so low that further reaction becomes uneconomical.

As is apparent from the diagrams of Fig. 1, by originally heating the reacting gases to a temperature of the order of 590° to 610° C., permitting the reaction to take place with a temperature drop of about 75° to 125° C., and re-heating one or more times to a temperature of about 590° to 625° C. with subsequent reaction periods, a total conversion equivalent to approximately 100% of the hydrocarbon gases present may be obtained whereas to obtain similar conversions in one passage through the catalyst chamber would require an initial temperature of about 675° C. This approximate 50° to 75° C. lower operating temperature provides longer life for the processing equipment and in addition, as will be described later, the subsequent re-heating and further reaction provide a process for the production of carbon disulfide and hydrogen sulfide with greater flexibility of control and more uniform operating condition, than can be obtained in a single heating and single catalyst bed reaction.

Fig. 2 illustrates diagrammatically one form of apparatus in which the process of this invention may be practiced. In this illustration a heating furnace 10 is provided with a bank of tubes 11 into which sulfur and hydrocarbon gases, such for example as methane, may be introduced. The hydrocarbon gas is preferably introduced through the line 12a in sulfur through the line 12b. The gases flow under the desired pressure through the first bank of tubes 11 where they are heated to the desired temperature and are then introduced into the first reactor 13, which, as explained hereafter, may or may not contain a catalyst promoting the formation of carbon disulfide. In the reactor 13 as well as in the heating tubes 11 the gases undergo a certain amount of reaction and in the reactor 13 a temperature drop will take place, as explained above.

From the reactor 13 the gases pass into a second bank of tubes 14 in the furnace 10 in which they are re-heated to the desired temperature and from which they are passed into a second reactor 15 where they undergo further reaction. From the reactor 15 the gases may be passed through the line 15a to the recovery system or through the line 15b into a third bank of tubes 16 in the furnace 10, suitable valves being provided for this purpose.

In the tubes 16 the gases are again re-heated to the desired temperature and are passed into a third reactor 17 where they undergo a further reaction and, again, a temperature drop. From the reactor 17 the reacted gases may be passed to a recovery system where the carbon disulfide and hydrogen sulfide are separated from the unreacted sulfur and hydrocarbon gases and recovered, while the unreacted sulfur and hydrocarbon gases may be recycled to the process. Any desired recovery system may be used. The one described, for example, in the United States patent to Folkins et al., No. 2,568,121, is suitable but other recovery systems may be used.

Fig. 3 illustrates six different conditions of operation of the process of this invention. The operating pressure in these examples is at an average of 60 lbs. per square inch gauge and the ratio of reactants is approximately 4.1 atoms of sulfur per atom of carbon as hydrocarbon gas (principally methane). The great flexibility of the process will be apparent from the description of these operations. In the apparatus described in connection with Fig. 2, a certain amount of reaction of sulfur and hydrocarbon gases to form carbon disulfide and hydrogen sulfide takes place in the passage of the gases through the heater tubes 11, 14 and 16 and in the passages to and from the catalyst beds in reactors 13, 15 and 17. In connection with the description of Fig. 3 this will be referred to as a non-catalytic reaction while the reaction in catalyst beds in reactors 13, 15 and 17 will be referred to as a catalytic reaction. In illustration 3d and 3e no catalyst is used in reactor 13 and in 3f the entire reaction is a non-catalytic reaction as no catalyst is used in any of the reactors.

In Fig. 3a the sulfur and hydrocarbon gases (preferably predominantly methane) are illustrated as being heated initially to a temperature of 580° C. and passed through reactor 13 at a space velocity of 404. In the non-catalytic reaction in tubes 11 and in the passage to reactor 13, approximately 4% of the hydrocarbon gases will react to form $CS_2$ and $H_2S$. The gas leaving reactor 13 is at a temperature of 477° C. and 44% of the hydrocarbon gas has reacted. In the reactor 13 the reaction rate at the exit temperature of 477° C. is so low that any continuation of the reaction becomes uneconomical. The gases are now re-heated in tubes 14 to 605° C. and passed into reactor 15; prior to passage through the catalyst bed in reactor 15, an additional small amount of hydrocarbon gases will undergo a non-catalytic reaction, and in passage through the catalyst bed in reactor 15 approximately 26% more of the hydrocarbon gases will be reacted to produce a conversion of 70% and a drop in temperature to about 520° C.

At this point the gases could, if desired, be passed to a recovery system for the recovery and separation of the $CS_2$ and $H_2S$, if the conversion of approximately 70% of the hydrocarbon gases is considered as economically satisfactory. If, however, additional conversion is desired, the gases may be passed through tubes 16 and re-heated to 600° C. and passed through reactor 17 containing a catalyst bed. In passing to and through reactor 17, a further conversion of approximately 26% of the hydrocarbon gases takes place, giving a total conversion of 96% at an outlet temperature from the reactor 17 of approximately 565° C. The reactors 13, 15 and 17, and the connecting pipes are preferably well insulated. However, about 10° C. of the temperature drop through each reactor in this and the other examples results from heat losses, the remainder of the temperature drop being caused by the endothermic nature of the reaction.

In Fig. 3b the operation of the process at higher temperature and space velocity is illustrated. In this application of the process, the temperature limit to which the apparatus is subjected is maintained between 615° C. and 482° C. After being heated initially to 600° C., the gases are passed through reactor 13 at a space velocity of 496 for a temperature drop to 482° C., during which approximately 50% of the hydrocarbon gases are converted to $CS_2$ and $H_2S$. The gases are then re-heated to 610 C. and passed into the reactor 15 where an additional 33% of the hydrocarbons are reacted, giving a total reaction of 83%, and the temperature drops to 547° C. The gases at this point could be conducted through line 15a to the recovery apparatus, however. Further re-heating to 615° C. in the tubes 16 and passage through reactor 17 produce a total reaction of 95% of the hydrocarbons to $CS_2$ and $H_2S$ at an outlet temperature of 575° C. from the reactor 17.

In illustration 3c the use of still higher temperatures to produce an approximate conversion of 98% of the hydrocarbons is portrayed. In this illustration the sulfur and hydrocarbon gases are heated to 610° C. in tubes 11 and passed into a catalyst bed reactor 13 to produce a reaction of 58% with a space velocity of 486 and a temperature drop of 124° to 486° C.; the gases are then re-heated to 625° C. and passed into catalyst bed reactor 15 in which a further reaction to approximately 91% takes place with a temperature drop to 566° C. At this point the gases could be passed through the line 15a to the recovery system; however, a third re-heating to 625° C. and passage through a third catalytic reaction stage will produce a total reaction of 98% and a temperature drop to about 595° C. The above three examples show the effectiveness with which the extent of reaction in each reactor can be controlled by the temperature and how the flexibility of the process permits the use of two or more heating and conversion steps to provide percentage conversions within the various ranges of economical operation.

In illustration 3d the application of the process to a non-catalytic reaction in which the reactor 13 contains no catalyst, is portrayed. In this illustration the sulfur and hydrocarbon gases are heated to 615° C. and passed into reactor 13 at a space velocity of 373. In the first stage non-catalytic reaction of 42% of the hydrocarbons is effected to produce $CS_2$ and $H_2S$, with a temperature drop of 92° C. The gases are then re-heated to 630° C. and passed into a second stage of reaction in reactor 15 containing a catalyst; here total conversion reaches approximately 89% with a temperature drop to 558° C.; a third re-heating to 627° C. and a third conversion stage in reactor 17, containing a catalyst, can be caused to produce a total conversion of 96.5% of the hydrocarbons with an outlet temperature from the third conversion stage of 592° C.

In the operation illustrated in Fig. 3d with no catalyst in reactor 13, any longitudinal mixing of the gases in the empty reactor will cause some drop in the conversion. Since longitudinal mixing is reduced by providing a plurality of small passages through the reactor, the preferred method of operation is to fill the reactor 13 with a non-catalytic, porous packing, such as checker brick or tile, Berl saddles or the like. In case 3d 25% of the void space in reactor 13 was occupied by a non-catalytic porous packing such as Raschig rings.

Another illustration of the process using one non-catalytic reactor followed by two catalytic reactors is given in Fig. 3e. Here the sulfur and hydrocarbons are heated to 607° C. and in the first (non-catalytic) stage of the reaction 31% of the hydrocarbons are reacted with a temperature drop of 67° C. The gases are then re-heated to 628° C. and passed into the second reactor 15, containing a catalyst where the total reaction of the hydrocarbons reaches 81.5% and the temperature drops to 544° C.; a third re-heating to 625° C. and subsequent catalytic reaction stage can be caused to bring the total reaction to 92.5% of the hydrocarbon gas originally introduced into the process, with an outlet temperature from the third reaction stage of about 611° C.

It is to be noted that the overall conversion of hydrocarbon is high in Examples 3d and 3e where the first stage operates non-catalytically, even though the conversion in the first stage is somewhat less than is obtained when that stage is operated catalytically. Example 3f shows that economically high conversions can be obtained when all three stages are non-catalytic. In this example of the practice of this invention, the sulfur and hydrocarbons are heated to 625° C. in tubes 11 and passed into an empty reactor 13 at a space velocity of 510. Conversion of approximately 55% of the hydrocarbons to $CS_2$ and $H_2S$ takes place during a temperature drop to 523° C.; re-heating the gases to 625° C. and passage through a non-catalytic reactor 15 brings the total conversion up to approximately 85% with a temperature drop to about 590° C.; further re-heating to 625° C. and passage through an empty reactor 17 will bring the conversion to approximately 95% with an outlet temperature of about 620° C.

The examples of Fig. 3 show the following temperature drops and percentage conversions:

| Example | Temp. Drop, 1st Stage, ° C. | Temp. Drop, 2nd Stage, ° C. | Temp. Drop, 3rd Stage, ° C. | Total Conversion, Percent |
|---|---|---|---|---|
| 3a | 103 | 85 | 35 | 96 |
| 3b | 118 | 63 | 40 | 95 |
| 3c | 124 | 59 | 30 | 98 |
| 3d | 92 (non-catalytic) | 72 | 35 | 96.5 |
| 3e | 67 (non-catalytic) | 84 | 14 | 92.5 |
| 3f (non-catalytic) | 102 | 35 | 5 | 95 |

While the examples have been described as three-stage reactions, it will be obvious that the reaction may be stopped at the end of the second stage, with a substantial conversion to $CS_2$ and $H_2S$ and the unreacted starting materials recovered and recycled to the process, also that more than three reaction stages and more than three re-heatings of the gases undergoing reaction may be used with lesser temperature differentials than those described, if desired.

In the above examples, space velocity is the ratio of the total volume of the gases, sulfur assumed to be as $S_2$, at 0° C. and 760 mm. Hg pressure passing through the apparatus per hour, to the volume of each stage of the apparatus. Since the examples included three stages, the overall space velocity would be one-third the values mentioned in the examples. Overall space velocities, based on total volume of the reaction apparatus, may lie between about 50 to 500, but the preferred range of operation is between about 120 and 250 reciprocal hours.

Pressures of 1 to 15 atmospheres may be used in the process; however, pressures between 3 and 10 atmospheres are preferred. In plant operations the reactors normally operate in the range of 45 to 90 pounds per square inch gauge depending on conditions in the catalyst beds.

While for the purposes of better illustration, the principles of this invention have been described with reference to given sets of operating conditions, including specific pressures, temperatures, space velocities and ratios of reactants, it will be understood by persons skilled in the art that the same principles of operation are applicable to different reaction conditions and different forms of equipment, and that various modifications of reaction conditions and equipment may be used without departing from the spirit of this invention or the scope of the following claims.

We claim:

1. The method of producing carbon disulfide and hydrogen sulfide by the reaction of sulfur vapor and hydrocarbon gases at superatmospheric pressure and of reducing corrosion on the equipment which comprises heating said gases in a plurality of stages to a reaction temperature between about 475° and about 625° C., causing a reaction to take place between said gases forming carbon disulfide and hydrogen sulfide with a consequent drop in temperature, reheating said gases with said formed carbon disulfide and hydrogen sulfide therein to a temperature between about 475° and about 625° C. and causing further reaction forming additional carbon disulfide and hydrogen sulfide to take place between said sulfur vapor and hydrocarbon gases, keeping the maximum temperature of the gases approximately 65° C. below the maximum temperature necessary to produce the same percentage conversion with one heating operation, and recovering carbon disulfide and hydrogen sulfide therefrom.

2. The method of claim 1 in which at least one of said reactions takes place in the presence of a catalyst promoting the formation of carbon disulfide.

3. The method of claim 1 in which at least one of said reactions is a non-catalytic reaction.

4. The method of claim 1 in which at least one of said reactions takes place in the presence of a catalyst promoting the formation of carbon disulfide and at least one of said reactions is a non-catalytic reaction.

5. The method of producing carbon disulfide and hydrogen sulfide by the reaction of sulfur vapor and hydrocarbon gases at superatmospheric pressure and of reducing corrosion on the equipment which comprises heating said gases in a plurality of stages to a reaction temperature between about 475° and about 625° C., causing a reaction to take place between said gases forming carbon disulfide and hydrogen sulfide with a consequent drop in temperature, reheating said gases with said formed carbon disulfide and hydrogen sulfide therein to substantially the initial reaction temperature of the first stage, and causing a further reaction forming additional carbon disulfide and hydrogen sulfide to take place between said sulfur vapor and hydrocarbon gases, keeping the maximum temperature of the gases substantially below the maximum temperature necessary to produce the same percentage conversion with one heating operation, and recovering carbon disulfide and hydrogen sulfide therefrom.

6. The method of claim 5 in which the gases are subjected to at least two re-heating operations and at least three reaction periods within said reaction temperature range.

7. The method of producing carbon disulfide and hydrogen sulfide by the reaction of sulfur vapor and hydrocarbon gases at superatmospheric pressure and of reducing corrosion on the equipment which comprises heating said gases in a plurality of stages to a reaction temperature between about 475° and about 625° C., causing a reaction to take place between said gases forming carbon disulfide and hydrogen sulfide during a temperature drop of approximately 75° to 125° C., reheating said gases with said formed carbon disulfide and hydrogen sulfide therein to a temperature between about 475° and about 625° C., and causing a further reaction forming additional carbon disulfide and hydrogen sulfide to take place between said sulfur vapor and hydrocarbon gases, keeping the maximum temperature of the gases approximately 65° C. below the maximum temperature necessary to produce the same percentage conversion with one heating operation, and recovering carbon disulfide and hydrogen sulfide therefrom.

8. The method of producing carbon disulfide and hydrogen sulfide by the reaction of sulfur vapor and hydrocarbon gases at superatmospheric pressure and of reducing corrosion on the equipment which comprises heating said gases in a plurality of stages with any formed carbon disulfide and hydrogen sulfide therein to a reaction temperature between about 475° and about 625° C., causing a reaction to take place between said gases forming carbon disulfide and hydrogen sulfide during a temperature drop of approximately 75° to 125° C., reheating said sulfur vapor and hydrocarbon gases with said formed carbon disulfide and hydrogen sulfide therein to substantially the initial temperature, and causing a further reaction forming additional carbon disulfide and hydrogen sulfide to take place between said sulfur vapor and hydrocarbon gases, keeping the maximum temperature of the gases approximately 65° C. below the maximum temperature necessary to produce the same percentage conversion with one heating operation, and recovering carbon disulfide and hydrogen sulfide therefrom.

9. The method of claim 8 in which the gases are subjected to at least two re-heating operations and at least three reaction periods within the reaction temperature range.

10. The method of producing carbon disulfide and hydrogen sulfide by the reaction of sulfur vapor and hydrocarbon gases containing methane at superatmospheric pressure which comprises heating said gases in a plurality of stages to a reaction temperature between about 475° and about 625° C., causing a reaction to take place between said gases forming carbon disulfide and hydrogen sulfide with a temperature drop of more than 90° C. and a methane conversion of more than 30%, re-heating said gases with the formed carbon disulfide and hydrogen sulfide therein to a temperature between about 475° and about 625° C., and causing further reaction forming carbon disulfide and hydrogen sulfide to take place within a temperature drop of less than 90° C., re-heating said gases with the formed carbon disulfide and hydrogen sulfide therein to a temperature between about 475° and about 625° C., and causing further reaction to take place within a temperature drop of less than 40° C., keeping the maximum temperature of the gases approximately 65° C. below the maximum temperature necessary to produce the same percentage conversion with one heating operation, and recovering carbon disulfide and hydrogen sulfide therefrom.

11. The method of producing carbon disulfide and hydrogen sulfide by the reaction of sulfur vapor and hydrocarbon gases at superatmospheric pressure which comprises heating said gases in a plurality of stages to a reaction temperature between about 575° to 625° C., causing a reaction to take place forming carbon disulfide and hydrogen sulfide with a drop in temperature of between about 75° and 125° C., re-heating said sulfur vapor and hydrocarbon gases with said formed carbon disulfide and hydrogen sulfide therein to substantially the initial reaction temperature of the first stage, and causing a further reaction forming carbon disulfide and hydrogen sulfide to take place between said sulfur vapor and hydrocarbon gases with a temperature drop of between about 35° and 85° C., keeping the maximum temperature of the gases approximately 65° to 75° C. below the maximum temperature necessary to produce the same percentage conversion with one heating operation, and recovering carbon disulfide and hydrogen sulfide therefrom.

12. The method of producing carbon disulfide and hydrogen sulfide by the reaction of sulfur vapor and hydrocarbon gases containing methane at superatmospheric pressure which comprises heating said gases in a plurality of stages to a reaction temperature between 550° and 650° C., causing a reaction to take place between said gases forming carbon disulfide and hydrogen sulfide with a temperature drop of more than 90° C. and a methane conversion of more than 30%, re-heating said gases with said formed carbon disulfide and hydrogen sulfide therein to a temperature between 600° and 650° C., and causing a further reaction to take place forming carbon disulfide and hydrogen sulfide with a temperature drop of less than 90° C., re-heating said gases with said formed carbon disulfide and hydrogen sulfide therein to a temperature between 550° and 650° C., and causing further reaction to take place with a temperature drop of less than 40° C., keeping the maximum temperature of the gases approximately 65° to 75° C. below the maximum temperature necessary to produce the same percentage conversion with one heating operation, and recovering carbon disulfide and hydrogen sulfide therefrom.

13. The method of producing carbon disulfide and hydrogen sulfide by the reaction of sulfur vapor and hydrocarbon gases at superatmospheric pressure which comprises passing said gases in vapor phase through a plurality of heating zones and a plurality of reaction zones, heating said gases in the first heating zone to a temperature of between about 475° and about 625° C., and passing said gases into a reaction zone in which an endothermic reaction takes place between said gases forming carbon disulfide and hydrogen sulfide with a temperature drop of between about 75° and 125° C., heating said gases with said formed carbon disulfide and hydrogen sulfide therein in a second heating zone to substantially the original temperature of the first zone, and passing said gases into a second reaction zone in which an endothermic reaction takes place forming carbon disulfide and hydrogen sulfide, and maintaining said gases under a superatmospheric pressure.

14. The method of producing carbon disulfide and hydrogen sulfide by the reaction of sulfur vapor and hydrocarbon gases at superatmospheric pressure which comprises passing said gases in vapor phase through a plurality of heating zones and a plurality of reaction zones, heating said gases in the first heating zone to a temperature of between about 475° and about 625° C., and passing said gases into a reaction zone in which an endothermic reaction takes place between said gases forming carbon disulfide and hydrogen sulfide with a temperature drop of between about 75° and 125° C., heating said gases with said formed carbon disulfide and hydrogen sulfide therein in a second heating zone to substantially the original temperature of the first zone, and passing said gases into a second reaction zone in which an endothermic reaction takes place forming carbon disulfide and hydrogen sulfide, heating said gases with said formed carbon disulfide and hydrogen sulfide therein in a third heating zone to substantially the original temperature of the first zone, and passing said gases into a third reaction zone in which an endothermic reaction takes place forming carbon disulfide hydrogen sulfide, and maintaining said gases under a pressure of about 30 to 90 lbs. per square inch gauge, keeping the maximum temperature of the gases approximately 65° to 75° C. below the maximum temperature necessary to produce the same percentage conversion with one heating operation, and recovering carbon disulfide and hydrogen sulfide therefrom.

15. The method of claim 14 in which at least one of said reaction zones contains a catalyst promoting the formation of carbon disulfide.

16. The method of claim 14 in which the reaction in at least one of said reaction zones is a non-catalytic reaction.

17. The method of claim 14 in which the reaction in one of said reaction zones is non-catalytic and in which two of said reaction zones contain a catalyst promoting the formation of carbon disulfide.

References Cited in the file of this patent
UNITED STATES PATENTS

| | | |
|---|---|---|
| 2,330,934 | Thacker | Oct. 5, 1943 |
| 2,378,651 | Matuszak | June 19, 1945 |
| 2,556,177 | Gamson | June 12, 1951 |
| 2,556,178 | Gamson | June 12, 1951 |
| 2,666,690 | Folkins | Jan. 19, 1954 |
| 2,709,639 | Folkins et al. | May 31, 1955 |